United States Patent
Gopalakrishnan et al.

(10) Patent No.: US 8,990,490 B2
(45) Date of Patent: Mar. 24, 2015

(54) MEMORY CONTROLLER WITH RECONFIGURABLE HARDWARE

(71) Applicant: Rambus Inc., Sunnyvale, CA (US)

(72) Inventors: Liji Gopalakrishnan, Sunnyvale, CA (US); Vidhya Thyagarajan, Sunnyvale, CA (US); Prasanna Kole, Sunnyvale, CA (US); Gidda Reddy Gangula, Sunnyvale, CA (US)

(73) Assignee: Rambus Inc., Sunnyvale, CA (US)

( * ) Notice: Subject to any disclaimer, the term of this patent is extended or adjusted under 35 U.S.C. 154(b) by 228 days.

(21) Appl. No.: 13/686,643

(22) Filed: Nov. 27, 2012

(65) Prior Publication Data
US 2013/0138911 A1 May 30, 2013

Related U.S. Application Data

(60) Provisional application No. 61/564,789, filed on Nov. 29, 2011.

(51) Int. Cl.
*G06F 12/00* (2006.01)
*G06F 12/06* (2006.01)
*G06F 13/16* (2006.01)

(52) U.S. Cl.
CPC ......... *G06F 12/0646* (2013.01); *Y02B 60/1225* (2013.01); *G06F 13/16* (2013.01)
USPC .......................................... 711/105

(58) Field of Classification Search
None
See application file for complete search history.

(56) References Cited

U.S. PATENT DOCUMENTS

| | | | |
|---|---|---|---|
| 7,296,112 B1 * | 11/2007 | Yarlagadda et al. | 711/105 |
| 8,069,379 B2 | 11/2011 | Perego et al. | |
| 2006/0104285 A1 * | 5/2006 | Kamiya et al. | 370/395.4 |
| 2006/0117155 A1 | 6/2006 | Ware et al. | |
| 2012/0036509 A1 * | 2/2012 | Srinivasan et al. | 718/102 |

* cited by examiner

*Primary Examiner* — Brian Peugh
(74) *Attorney, Agent, or Firm* — Stolowitz Ford Cowger LLP

(57) ABSTRACT

Memory controller concepts are disclosed in which hardware resources of a memory controller can be re-used or re-configured to accommodate various different memory configurations. The memory configuration may be stored in mode register bits (228), settable by a host or operating system. By re-configuring or reallocating certain resources of a memory controller, for example command logic blocks (A, B, C, D in FIG. 1A), a single controller design can be used to interface efficiently with a variety of different memory components. Command logic blocks that support N×M memory ranks, for example, can be reconfigured to support N ranks and M threads for multi-threaded memories (FIG. 1A). Data buffer (232, 254) depth can be extended by reconfiguring the buffers responsive to the mode register bits (228). Request buffers can be shared across command logic blocks, for example to increase the request buffer depth (FIG. 3A). Unused circuits can be powered down to save power consumption (FIG. 4A).

31 Claims, 14 Drawing Sheets

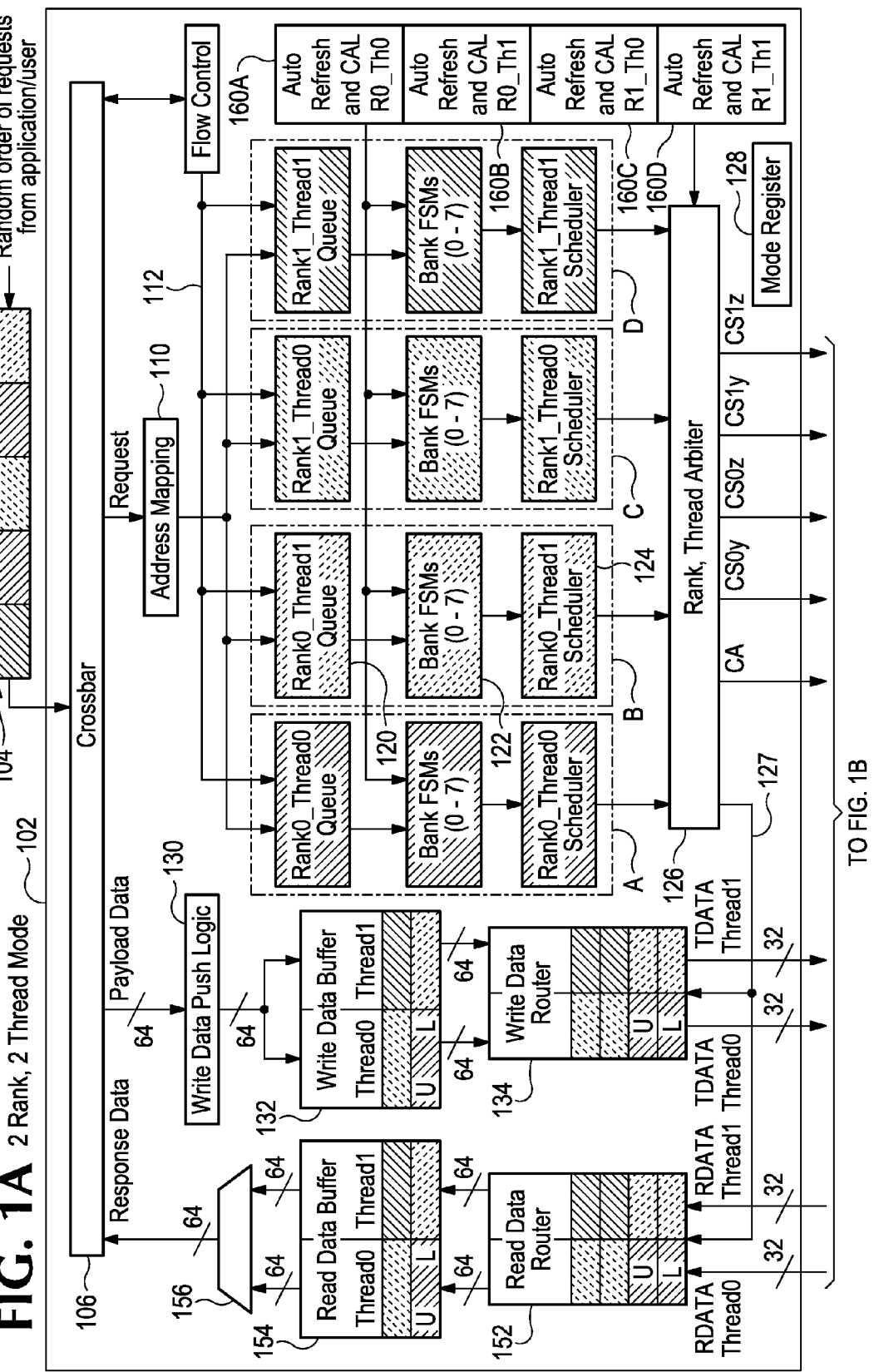
FIG. 1A 2 Rank, 2 Thread Mode

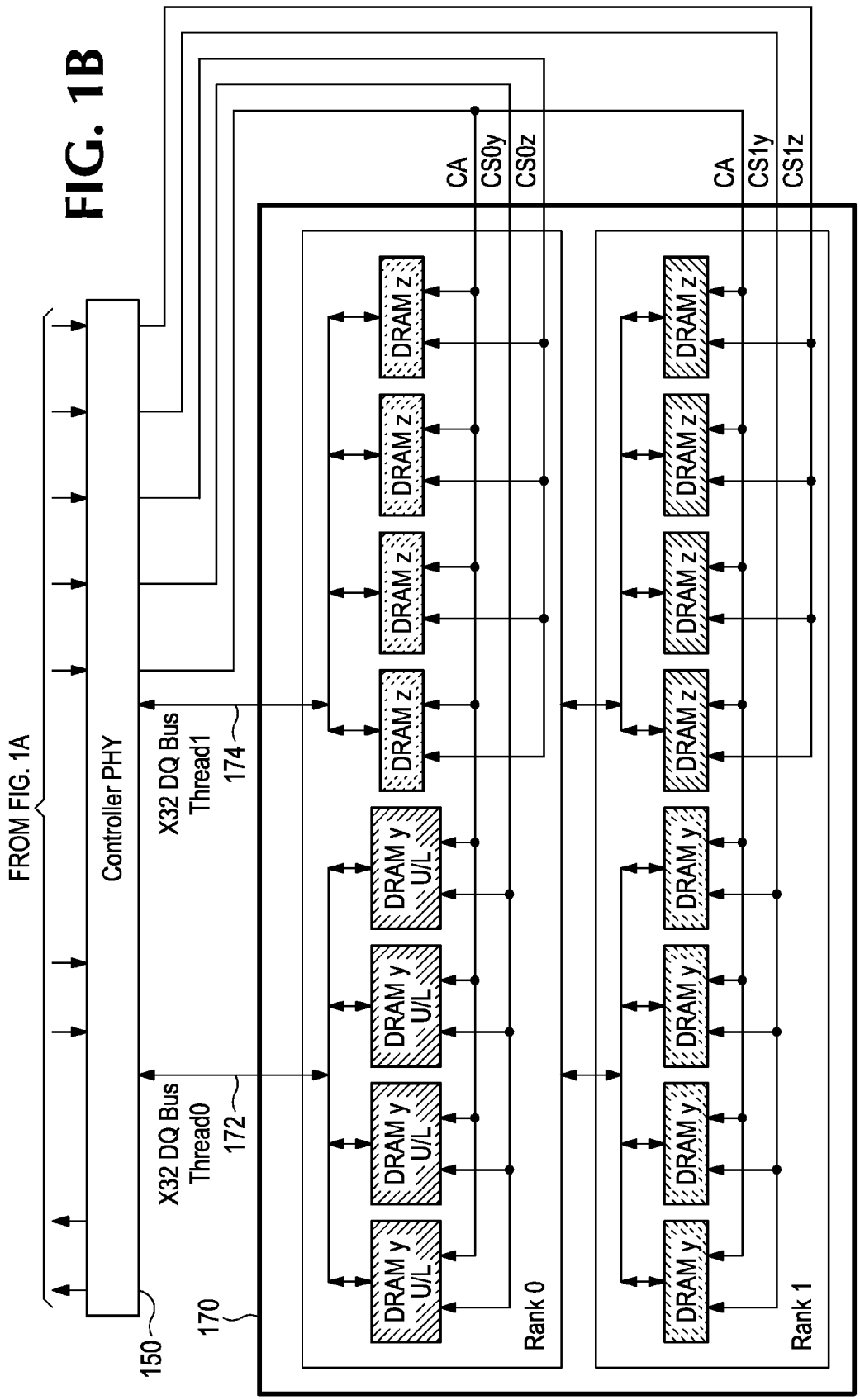

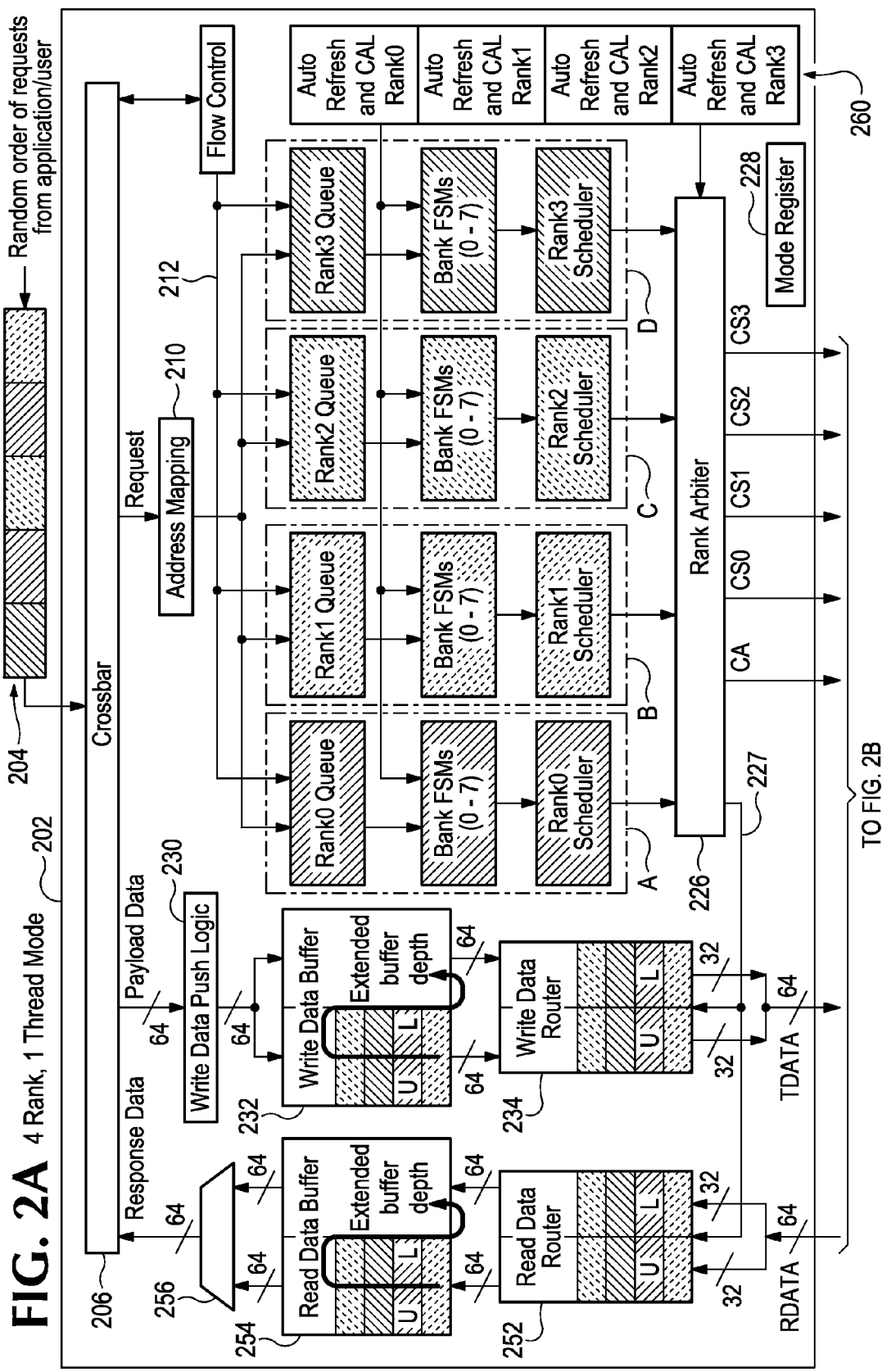
FIG. 2A 4 Rank, 1 Thread Mode

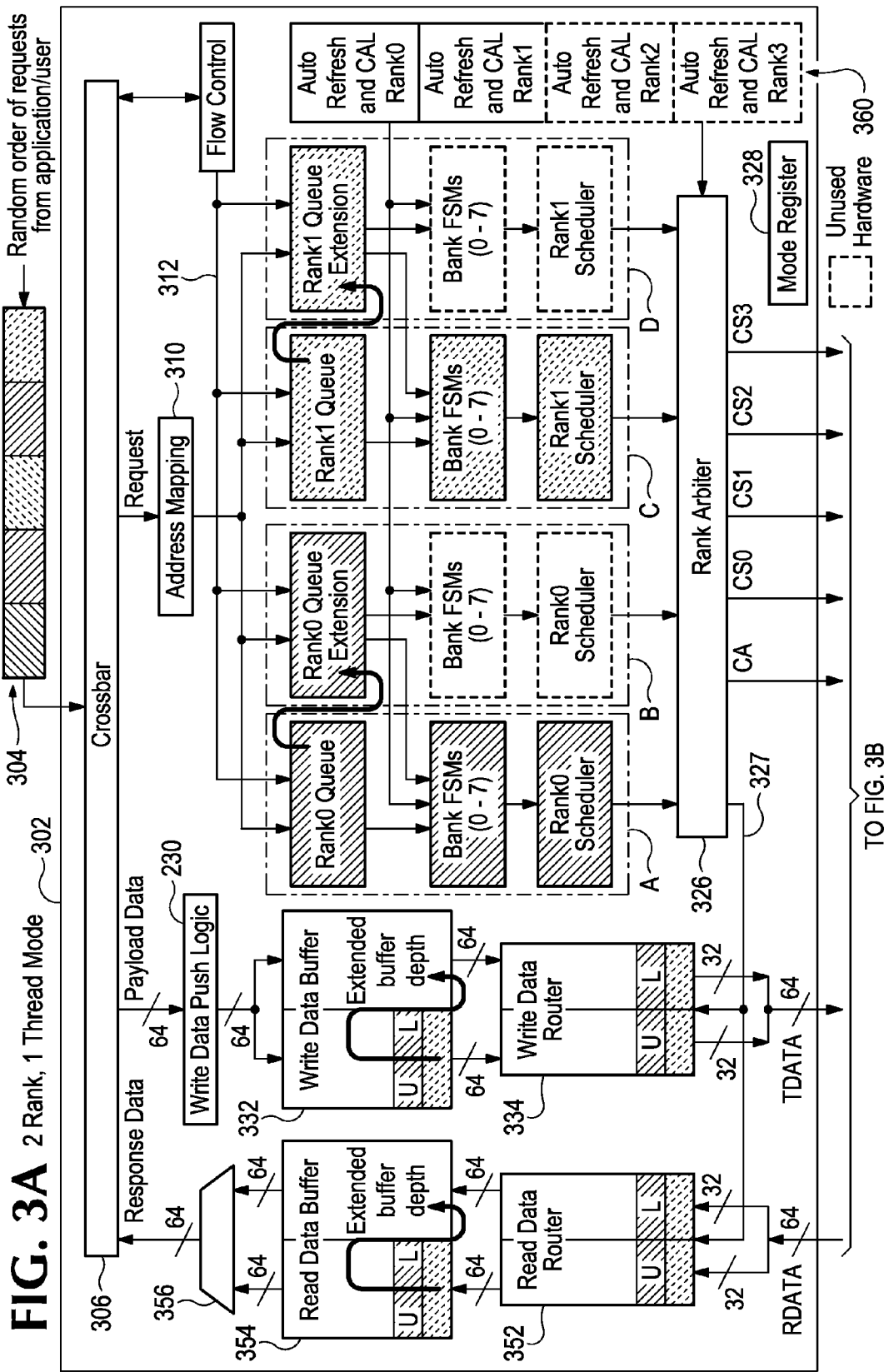
FIG. 3A 2 Rank, 1 Thread Mode

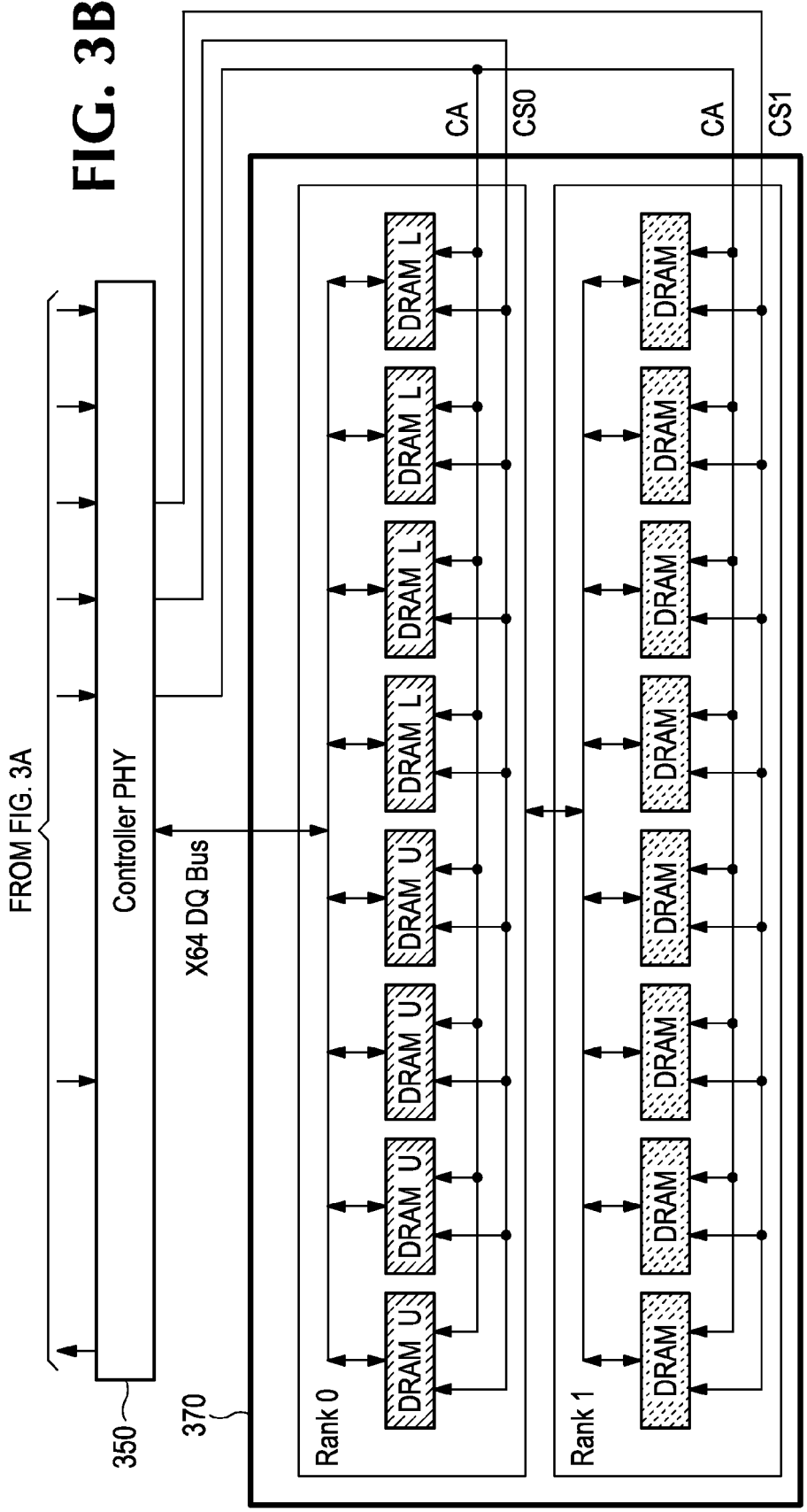

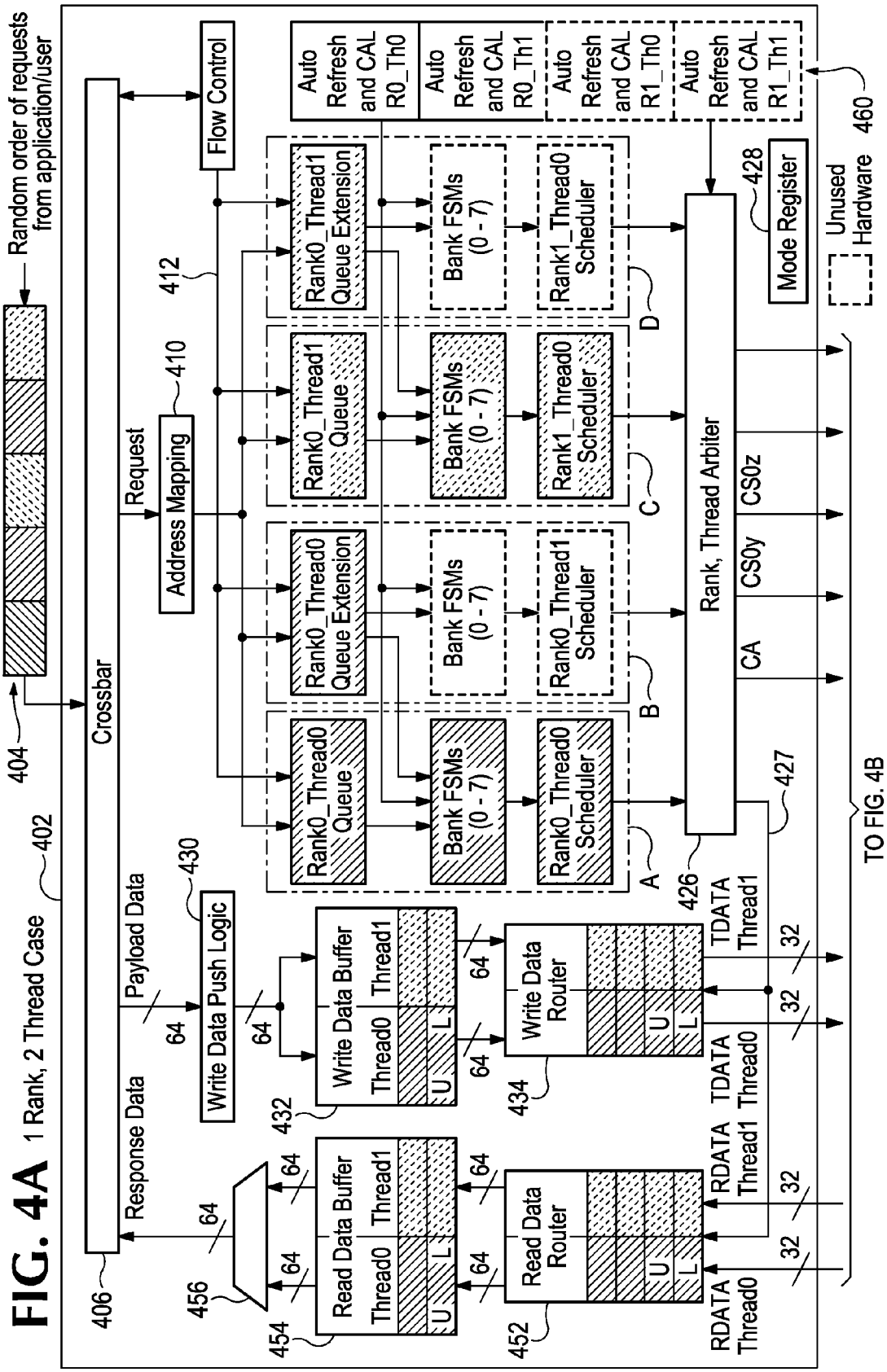
FIG. 4A 1 Rank, 2 Thread Case

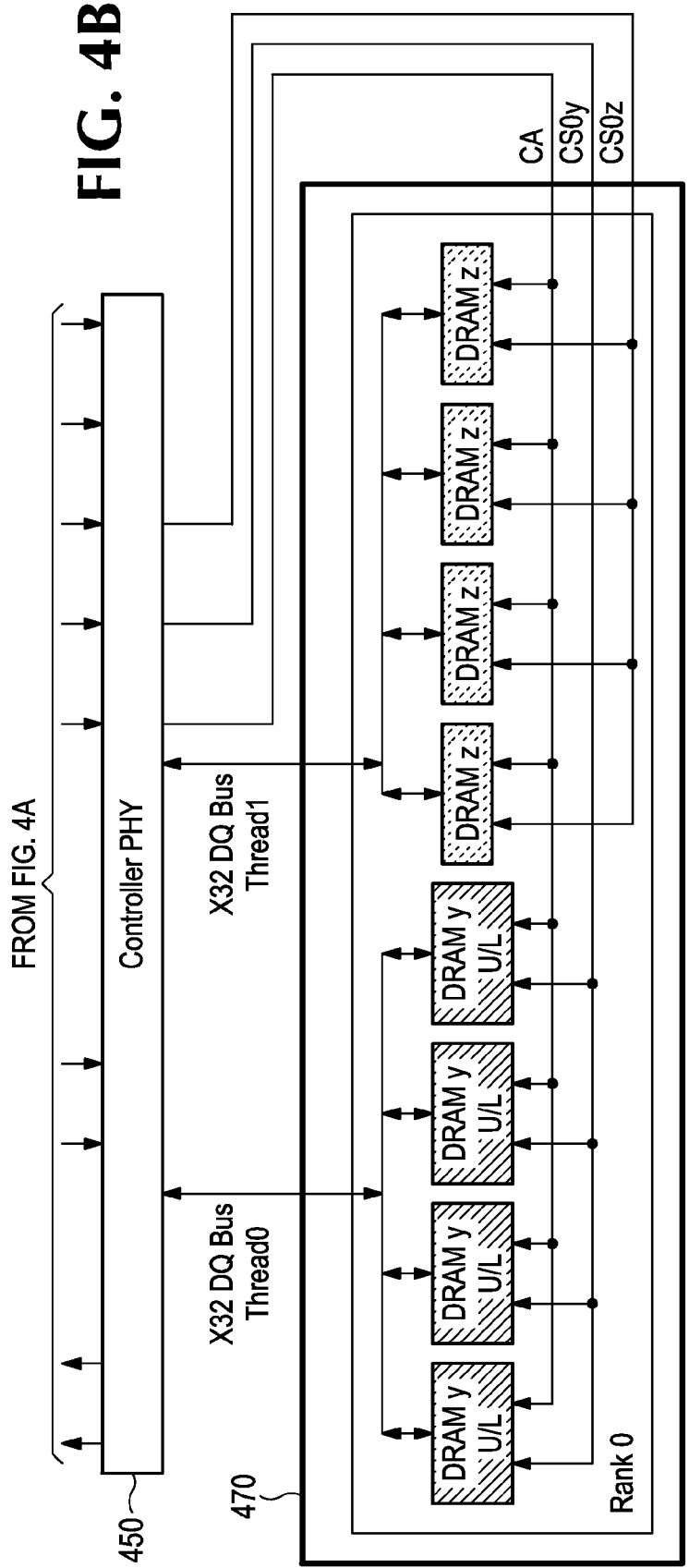

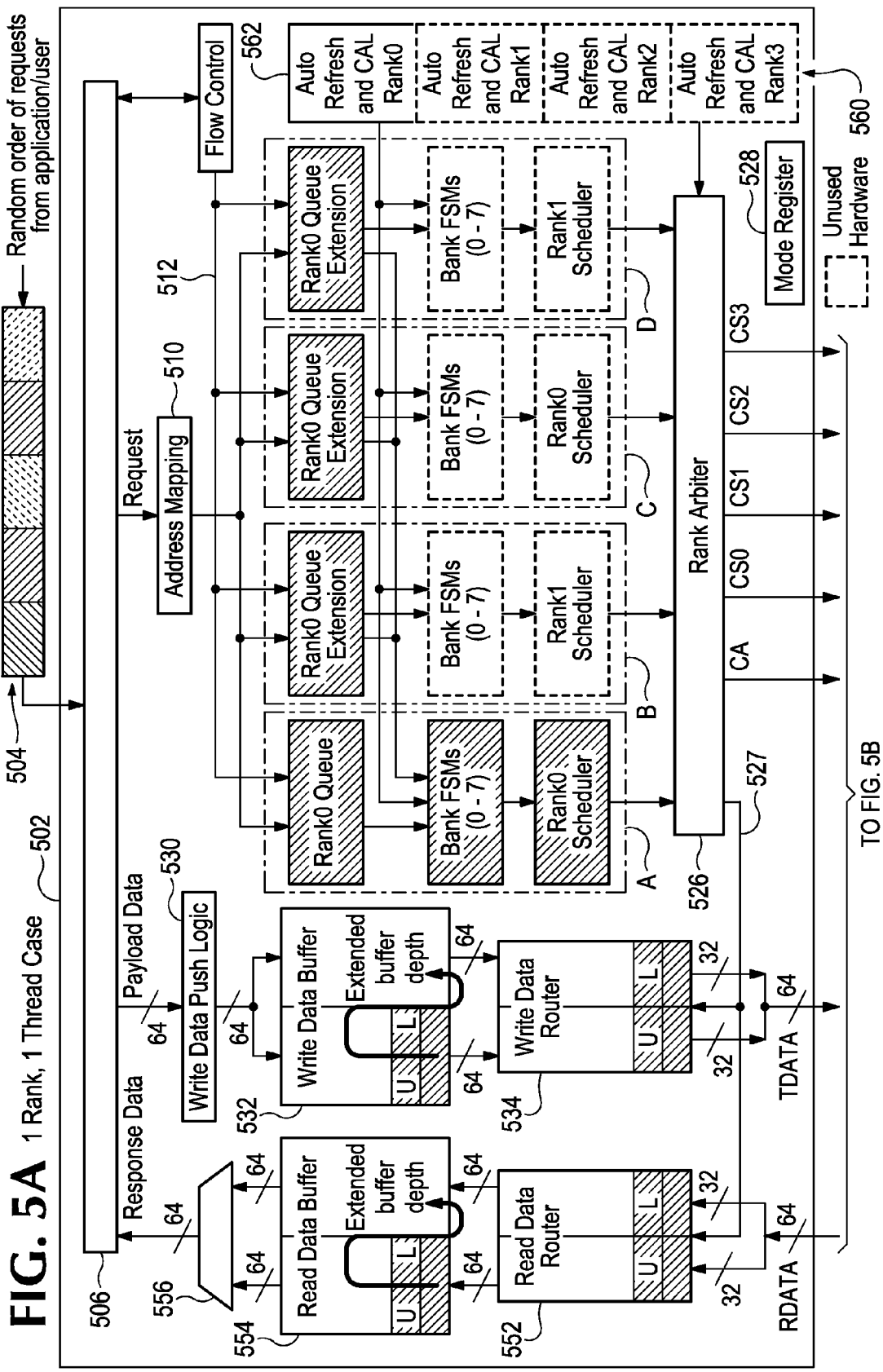
FIG. 5A 1 Rank, 1 Thread Case

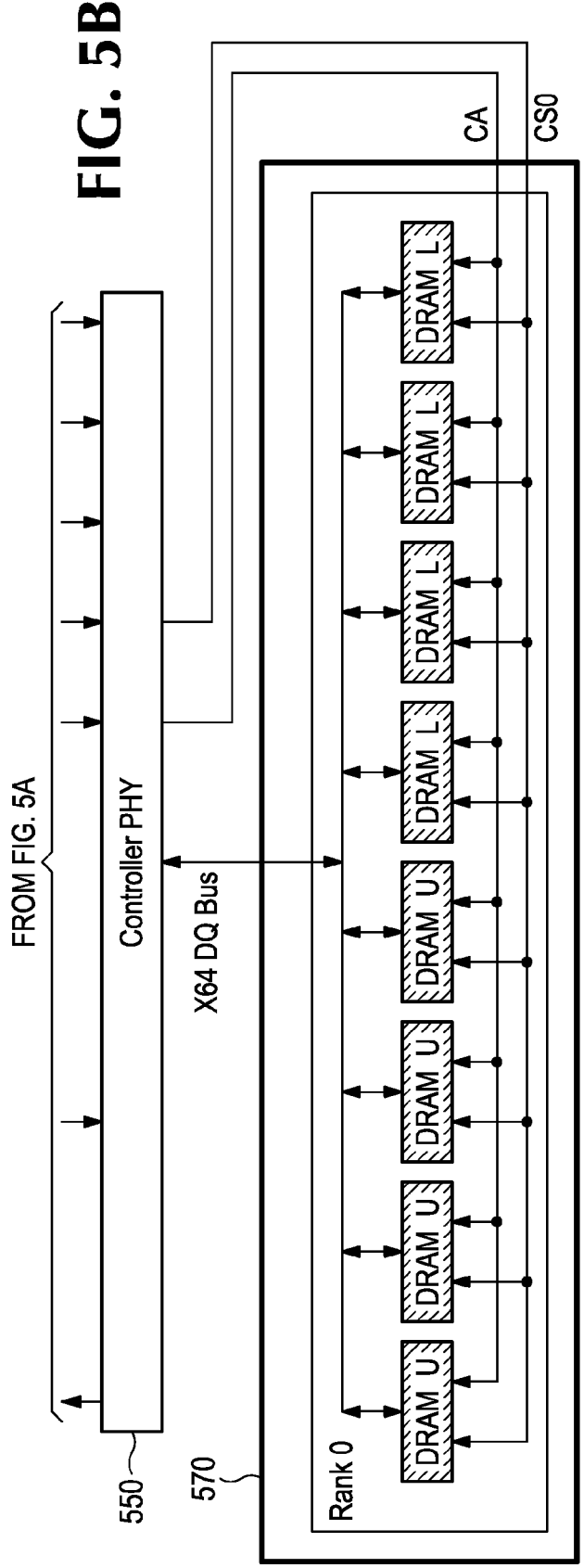

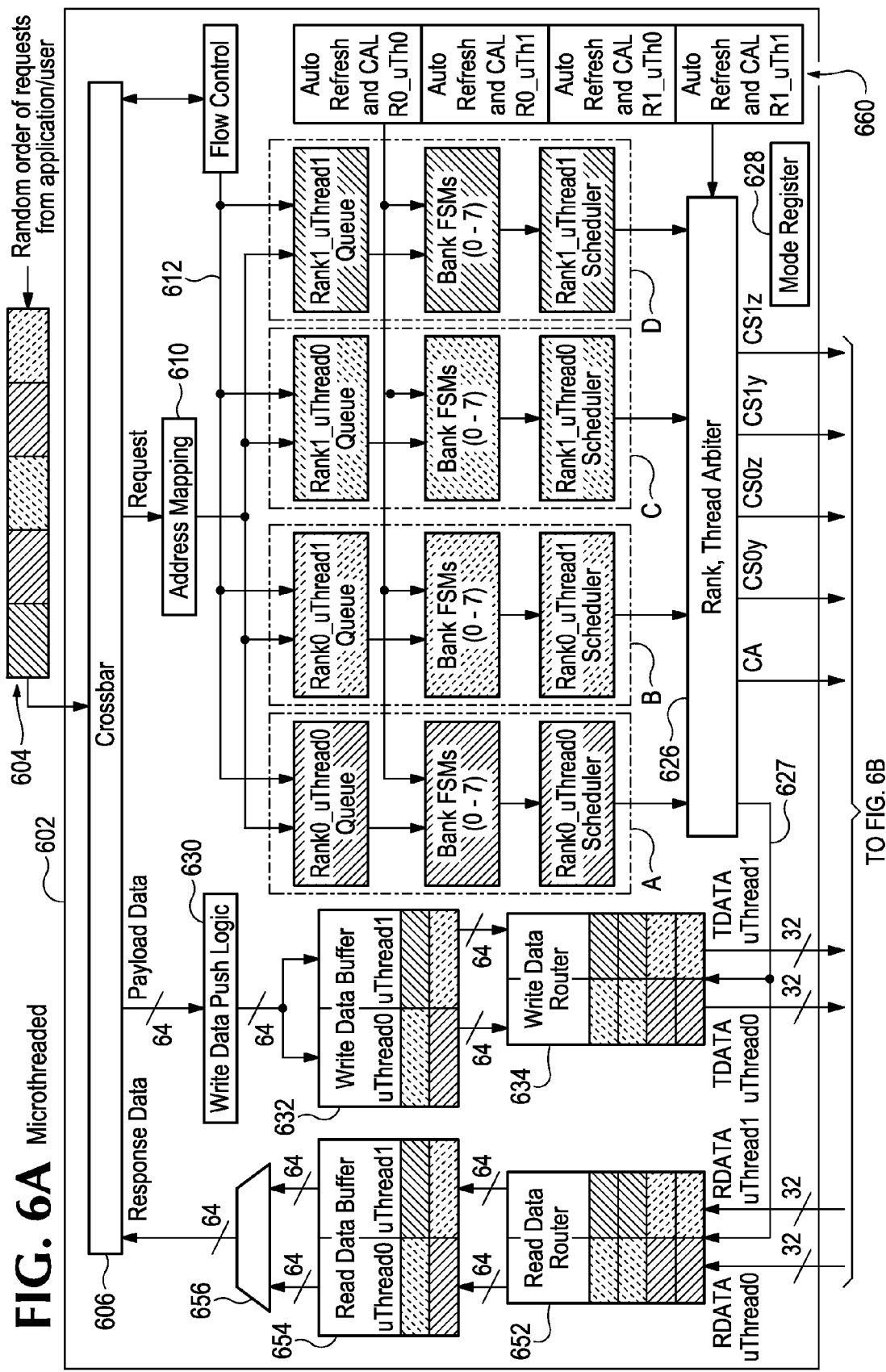
FIG. 6A Microthreaded

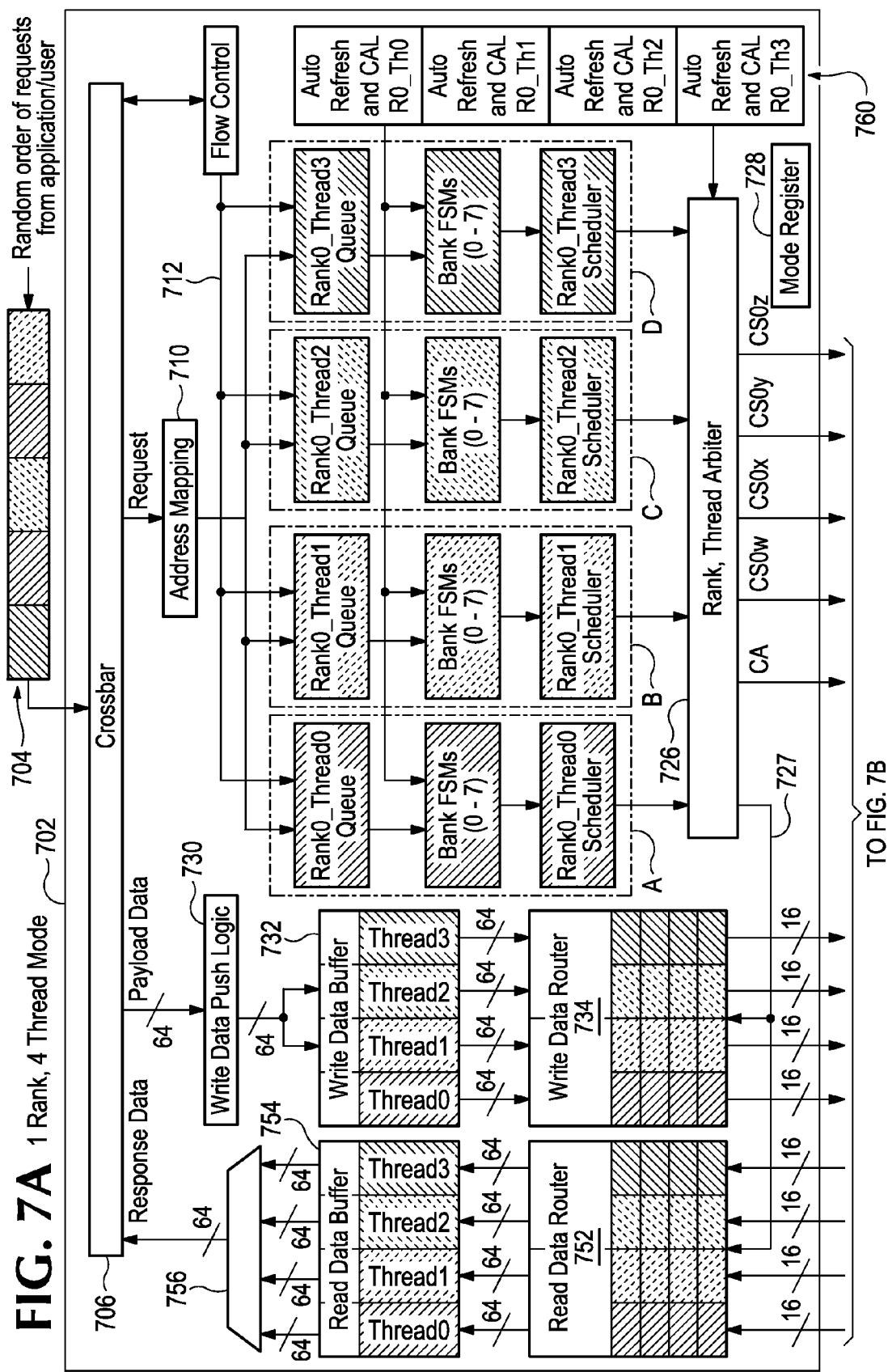
FIG. 7A 1 Rank, 4 Thread Mode

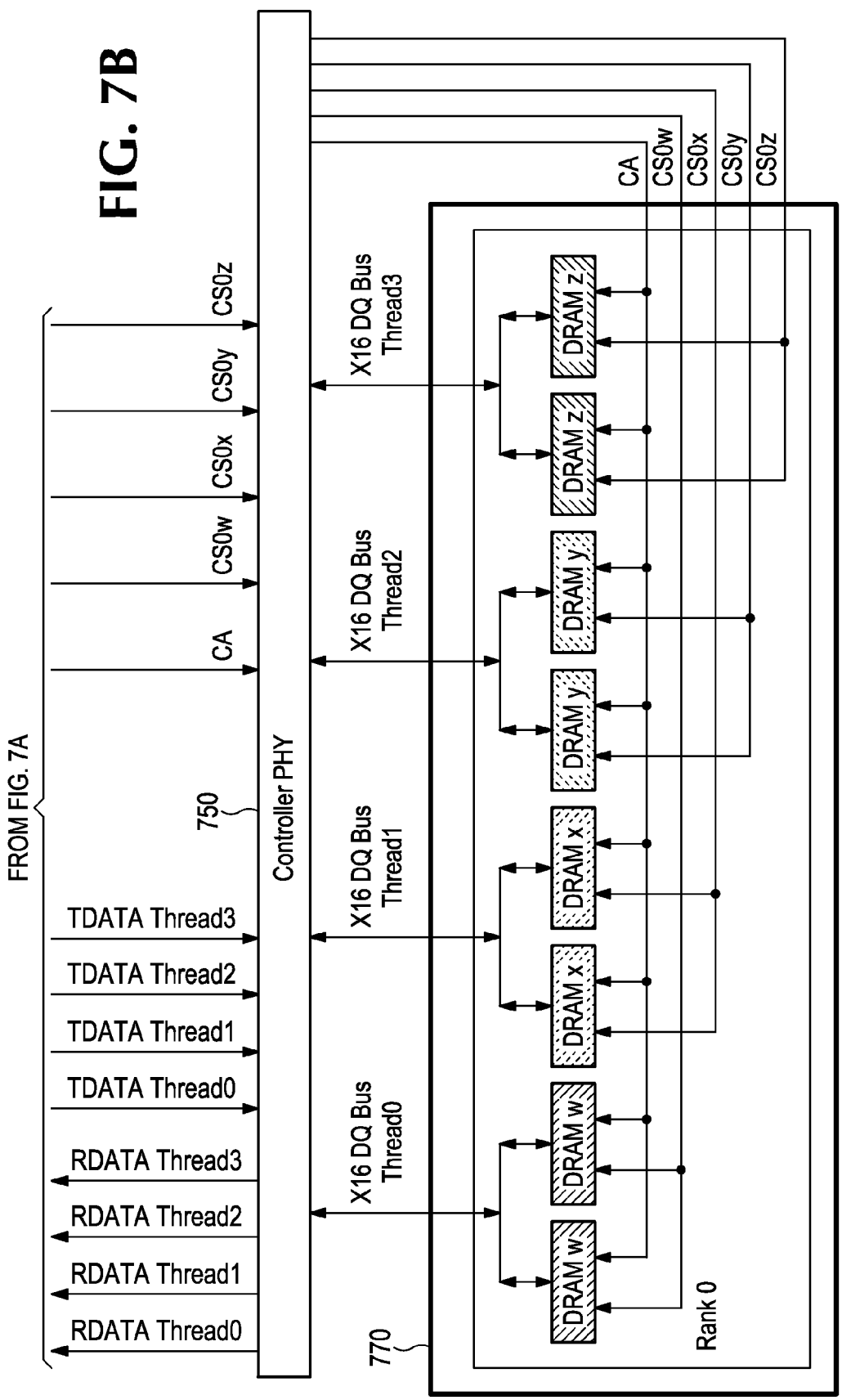

MEMORY CONTROLLER WITH RECONFIGURABLE HARDWARE

BACKGROUND OF THE DISCLOSURE

Memory controllers comprising circuits, software, or a combination of both, are used to provide access to a memory. Here we use "memory" in a broad sense to include, without limitation, one or more of various integrated circuits, components, modules, systems, etc. A memory controller generally receives and services requests from a "client"—for example a processor, peripheral device, operating system or application program—to access a memory. Such requests often require reading or writing data from/to a memory coupled to the controller.

BRIEF DESCRIPTION OF THE DRAWINGS

FIG. 1A is a simplified block diagram of a memory controller consistent with an embodiment of present disclosure, configured in a 2 Rank, 2 Thread mode.

FIG. 1B is a simplified block diagram of a memory showing connections to the memory controller of FIG. 1A.

FIG. 2A is a simplified block diagram of the memory controller of FIG. 1A, reconfigured in a 4 Rank, 1 Thread mode.

FIG. 3A is a simplified block diagram of the memory controller of FIG. 1A, reconfigured in a 2 Rank, 1 Thread mode.

FIG. 3B is a simplified block diagram of a memory showing connections to the memory controller of FIG. 3A.

FIG. 4A is a simplified block diagram of the memory controller of FIG. 1A, reconfigured in a 1 Rank, 2 Thread mode.

FIG. 4B is a simplified block diagram of a memory showing connections to the memory controller of FIG. 4A.

FIG. 5A is a simplified block diagram of the memory controller of FIG. 1A, reconfigured in a 1 Rank, 1 Thread mode.

FIG. 5B is a simplified block diagram of a memory showing connections to the memory controller of FIG. 5A.

FIG. 6A is a simplified block diagram of the memory controller of FIG. 1A, reconfigured to a 2 rank, microthreaded mode.

FIG. 7A is a simplified block diagram of the memory controller of FIG. 1A, reconfigured in a 1 Rank, 4 Thread mode.

FIG. 7B is a simplified block diagram of a memory showing connections to the memory controller of FIG. 7A.

DETAILED DESCRIPTION OF PREFERRED EMBODIMENTS

Figure 2B:
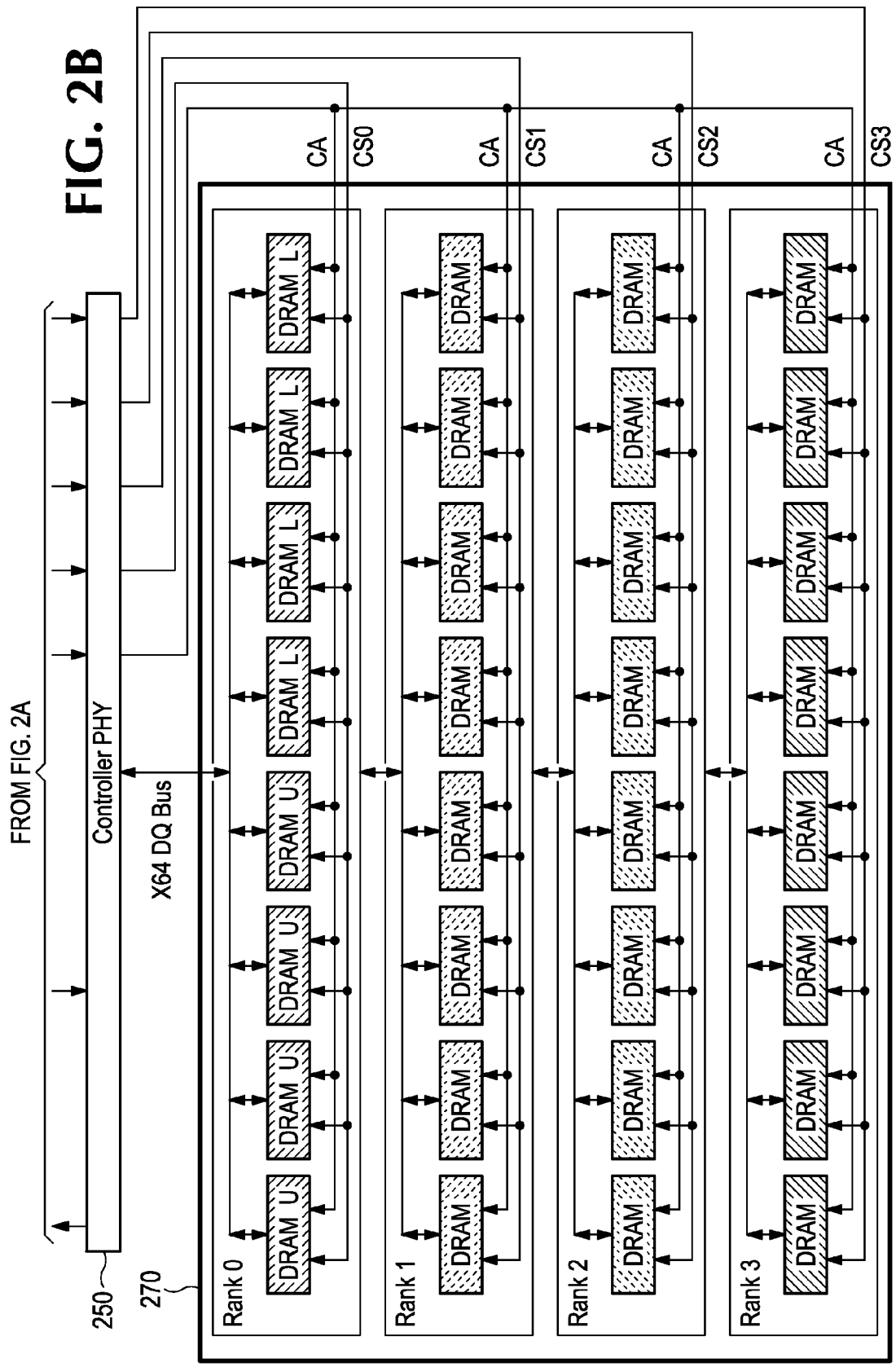
FIG. 2B is a simplified block diagram of a memory showing connections to the memory controller of FIG. 2A.

Several memory controller concepts are disclosed in which hardware resources of a memory controller can be re-used or re-configured in various ways. By re-configuring certain aspects of a memory controller, for example selected buffers, registers, or other circuits, a single controller can be used to interface efficiently with a variety of different memory components/component configurations.

In some embodiments, a memory controller can be configured to support threaded memory components. Threading refers to partitioning a unit of memory into multiple channels that each share at least some elements of a command/address bus, and that may or may not share a common data bus. For example, in the case of dual-threading per module, two threads are implemented for one memory module, e.g., either as two ranks sharing a common data bus, two half-ranks with separate data bus segments, or one rank of microthreaded memory that supports multiple threads on each memory device. (FIG. 1B shows a quad-threaded memory which may be a single module, with two ranks, each rank configured as two half-rank threads.)

In some embodiments, a memory controller with reconfigurable hardware may be configured to support microthreaded memory components. Microthreading refers to multiple threads implemented at the chip level, as distinguished from multiple threads at the rank, module or other component level. For example, with microthreading, the XDR2 interface can service four different read requests from four different locations in memory in a single read cycle.

We use the term "rank" in this description to refer to a unit of memory (one or more devices) associated with a DQ interface (arranged on the one or more devices) that can be operated concurrently and spans the entire DQ bus. (FIG. 1B illustrates two ranks of memory.)

In some embodiments, a memory controller with reconfigurable hardware may be reconfigured as needed to support various memory components having various numbers of ranks, threads, microthreads, and combinations thereof.

In a preferred embodiment, register bits may be used to configure the controller, i.e., to program allocation of controller resources. In this way, the controller is easily reconfigured to accommodate different memory configurations by changing the programming or "mode" bits. In one embodiment, the mode bits may be set by a host processor or operating system software. Mode bits may include but are not limited to rank count and thread count of a memory.

Power savings may be realized by disabling the clock tree to and/or powering down controller selected hardware resources of a controller to a standby state when the current operating mode does not require their use, as further explained below with regard to FIG. 3A.

Referring now to FIG. 1A, a simplified block diagram illustrates one example of a reconfigurable memory controller 102 consistent with the present disclosure. First we will summarize the main hardware resources of the controller in general, and later describe how various resources may be allocated or reconfigured for different modes of operation to interface with a variety of different memories. In general, each mode of operation corresponds to a particular arrangement of memory assets to be operated by the controller. For example, a 2 rank, 2 thread mode of operation configures the controller for accessing 2 rank, 2 thread memory assets.

In FIG. 1A, a request interface 104 may comprise one or more buffers for interfacing with memory clients to receive memory access requests. A crossbar 106 provides connections for such requests, including payload data, and responses, including response data. Requests traverse address mapping block 110 and are input to four CA (command/address) blocks, also called command blocks, labeled A, B, C and D. The number of CA blocks is merely illustrative and not limiting.

Each CA block comprises three main hardware components. For example, in CA block B, there is a request queue 120, bank FSMs (finite state machines) 122, and a scheduler 124. Each of the other CA blocks includes a corresponding request queue, bank FSMs and scheduler. A scheduler schedules memory access requests from the corresponding request queue.

Each of the CA blocks is coupled to arbiter circuit 126, which generates CA signals and CS signals to the memory as further explained below. The arbiter circuit 126 also provides control signals 127 to the read and write data buffers discussed below. Allocation of the CA hardware resources is reconfigurable as further explained below. In a preferred embodiment, the configuration or operating mode is determined by bits of a mode register block 128. The bits may be set by a host system software or operating system, depending on the memory resources to be controlled by the controller.

On the left side of FIG. 1A, a data write path in the controller (see "Payload Data") generally comprises a write data push logic 130, a write data buffer 132, and a write data router 134. The router 134 data lines are coupled through the controller's memory interface (PHY) circuitry 150 (FIG. 1B) to a memory DQ bus. In the read direction, DQ bus lines from the controller PHY circuitry 150 are coupled to a read data router 152. The router provides data to a read data buffer 154. The buffer 154 in turn provides data to the crossbar 106, via multiplexer 156, to return response data to the client. The buffer widths and various bus widths are merely illustrative and not limiting. In some embodiments, a memory controller may have a fixed buffer width (say 256 bits) to handle all the parallel data that is sent/received in 1 parallel clock (PCLK) cycle between the controller and the PHY. This width depends on the channel data rate, the total number of DQ lines (e.g. ×64) and the PCLK frequency. For example, if the data rate is 1.6 Gbps for a ×64 DQ channel and PCLK=400 MHz, the buffer width=(1.6G*64/400M)=256. (A buffer of this size is shown in FIG. 7A.). In some embodiments, the memory controller may use a clock that is double the PCLK frequency, thus allowing the buffer width to be half (say 128 bits) of the previous case.

Referring now to the right side of FIG. 1A, a series of four auto refresh and calibration circuits 160A-160D are shown. In some embodiments, one auto refresh and calibration circuit is provided for each CA block. The memory controller of FIG. 1A can be reconfigured in a variety of ways, some of which are discussed below by way of illustration and not limitation. For example, in some modes, CA block hardware resources may be reallocated, including separate reallocation of any or all of the request queues, bank FSMs and/or schedulers of individual CA blocks.

In some embodiments, in certain modes of operation, any or all of the auto refresh and calibration circuits 160A-160D may be reallocated, or powered down if unused. Further, in some embodiments, in certain modes of operation, any or all of the data read and data write resources summarized above may be reconfigured, as described below in greater detail.

2 Rank 2 Thread Mode

FIG. 1A further illustrates a 2 Rank 2 Thread ("2R-2T") mode of operation. This mode is selected, for example, by the mode register bits 128. This mode is selected to interface, e.g., with a memory of the type illustrated as memory 170 in FIG. 1B. In this example, the memory component may comprise a single memory module, but this is merely illustrative. In this description, a "memory" (for example 170, 270, 370), except as otherwise specified, refers to any physical arrangement or packaging of one or more memory devices, for example comprising one or more integrated circuits or portions thereof, memory modules, circuit boards, components, sub-assemblies, etc.

Memory 170 is organized into Rank 0 and Rank 1, and it implements two DQ bus threads, labeled Thread0 and Thread 1, so that one-half of the DRAM chips in each rank are coupled to Thread0 DQ bus 172, and the other half of the DRAM chips (in each rank) are coupled to Thread1 DQ bus 174.

Referring once again to FIG. 1A, in the 2R-2T mode, CA block A is allocated to memory Rank0_Thread0, selected by a chip select signal CS0$y$; CA block B is allocated to Rank0_Thread1, selected by a chip select signal CS0$z$; CA block C is allocated to Rank1_Thread0, selected by a chip select signal CS1$y$; and finally, CA block D is allocated to Rank1_Thread1, selected by a chip select signal CS1$z$. These allocations may be implemented within the controller by control signals (not shown), responsive to the mode register bits 128. In the drawing, hatching is used (diagonal direction, dashed or solid) to distinguish the four different memory rank/thread allocations of the CA blocks. The corresponding shading in the DRAM chips in FIG. 1B further indicates the current allocation of resources. Rank, Thread Arbiter logic 126 generates the appropriate CA and chip select signals appropriate to the current mode; these are forwarded through the PHY 150 as indicated in FIG. 1B.

Further, in this mode 2R-2T, each one of the auto refresh and calibration circuits 160 is allocated to a respective one of the memory rank/threads. For example, 160A is allocated to Rank0_Thread0, while 160C is allocated to Rank1_Thread0, etc.

In the write data path, the write data buffer 132 is configured, responsive to the mode register bits, so that one-half its width (64 bits) is allocated to each thread. Each one-half word could be associated with any of the ranks on that thread, depending on the order of requests. FIG. 1A shows the case where each half word is associated with a different rank. The mapping between the data in the buffers and the corresponding CA block resources is indicated by the shading. The write data buffer provides data to the write data router 134. The router also is configured, responsive to the mode register bits, to accommodate the current operating mode (2R-2T). In this example, the router configures the data into two threads corresponding to the Thread 0 and Thread 1 (32-bit) DQ buses.

In the read data path, the read data router 152 is configured, responsive to the mode register bits, to receive data from the two threads as shown, and route that data to the read data buffer 154. The read data buffer, also configured responsive to the mode register bits, buffers the data and organizes it for transmission, via multiplexer 156, (64 bits wide) via the crossbar 106 to the request interface to return the requested read data. In this example, we see how substantially all of the principal hardware resources of the controller are configured to access the 2R-2T memory resources so as to concurrently process four client requests.

The foregoing example illustrates how request queues and buffers that support N*M memory ranks for single threading-per-rank can be re-assigned to support N ranks and M threads of multi-thread memory.

4 Rank 1 Thread Mode

FIG. 2A illustrates a 4 Rank 1 Thread ("4R-1T") mode of operation. This mode is selected, for example, by the mode register bits 128. This mode is selected to interface, e.g., with a memory component 270 shown in FIG. 2B. Memory 270 may be any component or combination of components that provides 4 ranks of memory and a single DQ thread interface.

To avoid redundancy, in FIGS. 2A, 2B, and all subsequent drawing figures, elements corresponding to those shown in FIGS. 1A-1B are identified with the same reference numbers as those shown in FIGS. 1A-1B, except that the first digit is changed to reflect the current figure number. For example, the crossbar 106 is identified as 206 in FIG. 2A, as 306 in FIG.

3A, etc. Accordingly, where an element in a subsequent drawing is not described specifically, the reader may refer to the description of the corresponding element of FIGS. 1A-1B.

Referring to FIG. 2A, in the 4R-1T mode, the drawing shows how each one of the four CA blocks A,B,C and D is now allocated to a respective one of the four ranks of memory, Rank0-Rank3. As noted, these allocations may be implemented by control signals (not shown), responsive to the mode register bits 228. As before, hatching is used on the DRAM devices in FIG. 2B to indicate the allocation of CA block resources.

Rank Arbiter logic 226 generates the appropriate CA and chip select signals appropriate to the current mode. Chip select signals CS0-CS3 are routed to memory 270, Rank 0-Rank 3, respectively. As above, the arbiter 226 also provides control signals 227 to the data buffers.

Further, in this mode 4R-1T, each one of the auto refresh and calibration circuits 260 is allocated to a respective one of the memory ranks as shown.

In the write data path, the write data buffer 232 is reconfigured, responsive to the mode register bits, so that the buffer depth is extended. That is, as there is only a single data thread, 64-bits wide in the example, the buffer is reconfigured to fully utilize the available buffer space. The other hardware resources (CA block logic, rank arbiter, etc.) properly coordinate with the reconfigured write data buffer as they too are configured to the same 4R-1T mode. The write data router 234 routes the data from the buffer as indicated by the shading to the single thread interface "TDATA."

In the read data path of FIG. 2A, the read data router 252 is configured, responsive to the mode register bits, to receive data from the single data thread as shown, and route that data to the read data buffer 254. The read data buffer, also configured responsive to the mode register bits, provides an extended buffer depth like the write data buffer. In this example, we see how some of the principal hardware resources of the controller are reconfigured to access the 4R-1T memory resources and utilize the controller resources efficiently. In general, data buffer depth may be increased by a factor of M when a single data thread is enabled instead of M data threads.

2 Rank 1 Thread Mode

FIG. 3A illustrates a 2 Rank 1 Thread ("2R-1T") mode of operation of a controller. A simplified diagram of a 2R-1T type of memory 370 is shown in FIG. 3B, coupled to the controller of FIG. 3A. The controller architecture and its general operation were described above, so they will not be repeated here. Rather, certain additional features and benefits illustrated by FIGS. 3A-3B will be described.

Referring to FIG. 3A, the CA logic blocks are reconfigured as follows. First, CA block A is allocated to Rank 0. However, here the request queue of CA block B (120 in FIG. 1A) is also allocated to Rank 0, so as to extend the Rank 0 request queue depth. Similarly, in this mode, CA block C is allocated to Rank 1, and the request queue of CA block D is also allocated to Rank 1, thereby extending the Rank 1 request queue depth. Thus both rank request queues are extended in this mode. This example illustrates how request queues are shared among CA blocks. In general, where the command logic hardware resources include multiple request queues, at least one of the request queues may be reconfigured so as to extend the depth of another one of the request queues, responsive to the current operating mode of the controller.

Further, the Bank FSMs and rank schedulers of both CA blocks B and D are not needed in this mode, so they can be set to a standby or low-power state, indicated by dashed lines in the drawing. The CA block A scheduler schedules memory access requests from both block A and block B request queues. Similarly, The CA block C scheduler schedules memory access requests from both block C and block D request queues as illustrated in FIG. 3A.

Also in this 2R-1T mode, two of the auto refresh and calibration blocks 360 are allocated to respective ranks (Rank 0, Rank 1), but the remaining two auto refresh and calibration blocks may be set to a standby or low-power state, again indicated by dashed lines in the drawing.

Turning to the data paths in FIG. 3A, the reader can observe that the read data buffer 354 and write data buffer 332 are again extended, as discussed above with regard to FIGS. 2A-2B, illustrating a 4R-1T mode. To summarize, in this mode, data buffers are extended, and request queues are extended, yet power consumption is reduced, relative to some other modes.

1 Rank 2 Thread Mode

FIG. 4A illustrates a 1 Rank 2 Thread ("1R-2T") mode of operation. This configuration controls a memory 470 illustrated in FIG. 4B. The controller architecture and its general operation were described above, and such will not be repeated here. Rather, certain additional features and benefits illustrated by FIGS. 4A-4B will be highlighted.

Referring to FIG. 4A, the CA logic blocks are reconfigured as follows. First, CA block A is allocated to Rank 0, thread 0. However, here the request queue of CA block B (120 in FIG. 1A) is also allocated to Rank 0, Thread 0 so as to extend the Rank 0, Thread 0 request queue depth. CA block C is allocated to Rank 0, Thread 1, and the request queue of CA block D is also allocated to Rank 0, Thread 1, thereby extending the Rank 0, Thread 1 request queue depth. So both thread request queues are extended. In this way, request queues are shared among command blocks in this single rank mode.

Further, the Bank FSMs and rank schedulers of both CA blocks B and D are not needed in this mode, so they can be set to a standby or low-power state, indicated by dashed lines in the drawing.

Also in this 1 R-2T mode, two of the auto refresh and calibration blocks are allocated to respective threads (Rank 0, Thread 0 and Rank 0, Thread 1), but the remaining two auto refresh and calibration blocks may be set to a standby or low-power state, again indicated by dashed lines in the drawing.

As before, the rank, thread arbiter logic generates the appropriate control signals. In this mode, only chip select signals CS0*y* and CS0*z* (and CA) are needed. These are coupled to the memory as indicated in FIG. 4B.

1 Rank 1 Thread Mode

FIG. 5A illustrates a 1 Rank 1 Thread ("1R-1T") mode of operation. This configuration controls a memory 570 illustrated in FIG. 5B. The controller architecture and its general operation were described above, and such will not be repeated here. Rather, certain additional features and benefits illustrated by FIGS. 5A-5B will be highlighted.

Referring to FIG. 5A, the CA logic blocks are reconfigured as follows. First, CA block A is allocated to Rank 0. In addition, the request queues of CA blocks B, C and D are also allocated so as to extend the Rank 0 request queue depth. Thus request queues are shared across command blocks in this single rank mode.

Further, the Bank FSMs and rank schedulers of CA blocks B, C and D are not needed in this mode, so they can be set to a standby or low-power state, indicated by dashed lines in the drawing.

In the write data path, write data buffer 532 is reconfigured to extend the buffer depth, thus taking advantage of the full buffer width (128 bits by way of illustration). Similarly, the read data buffer 554 is reconfigured to extend its buffer depth. Also in this 1R-1T mode, a single auto refresh and calibration block 562 is allocated to the single rank 0. The remaining three auto refresh and calibration blocks may be set to a standby or low-power state, again indicated by dashed lines in the drawing.

As before, the rank arbiter logic 526 generates the appropriate control signals—in this mode, only CA and CS0 are needed. These signals are coupled to the memory 570 as indicated in FIG. 5B.

Microthreaded Modes of Operation

Figure 6B:
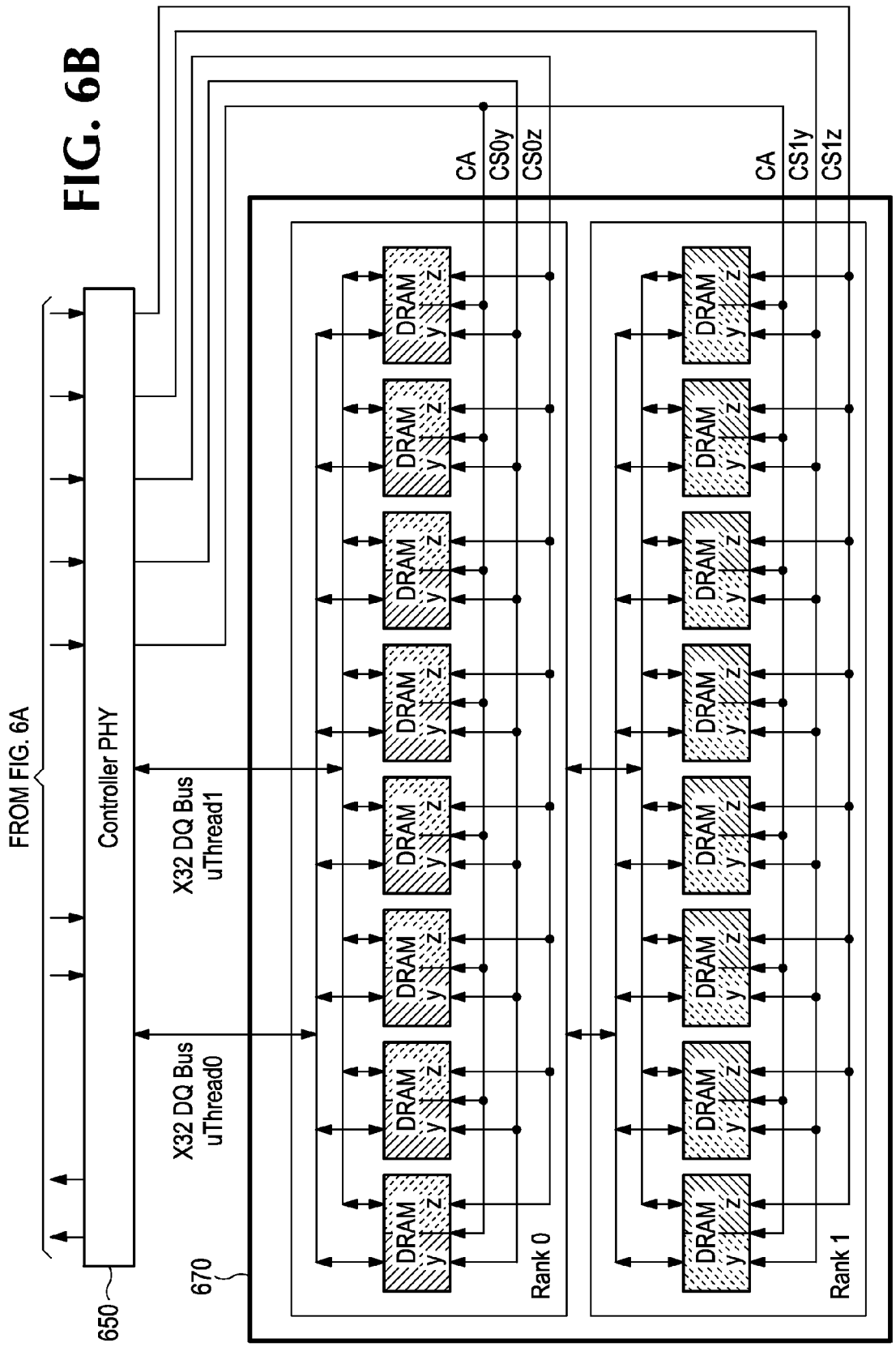
FIG. 6B is a simplified block diagram of a microthreaded memory showing connections to the memory controller of FIG. 6A.

FIG. 6A is a simplified block diagram of the memory controller of FIG. 1A, reconfigured to a 2 rank, dual-microthreaded mode. A 2 rank, dual-microthreaded memory 670 is illustrated in FIG. 6B. In this example, each microthread comprises a 32-bit data path (see X32 DQ bus μthread 0, μthread 1 in FIG. 6B). The controller configuration of FIG. 6A is similar to the 2 Rank, 2 Thread mode described above with regard to FIGS. 1A-1B. Briefly, each CA block is allocated to a respective memory rank and micro-thread. For example, CA block A is allocated to Rank0, μthread 0; block B to Rank 0, μthread 1, etc. Since there are two ranks and two micro-threads of memory, all four CA blocks are used. In general, where the mode register reflects a micro-threaded configuration of memory, the controller allocates each command block for accessing a respective memory space of the memory, defined by a rank number and a microthread number.

Similar to FIGS. 1A-1B, all four auto refresh and calibration resources are used; each of them is assigned to a corresponding rank/micro-thread as shown in the FIG. 6A. Also in a manner analogous to FIG. 1A, the write data buffer 632 and read data buffer 654 are arranged to allocate one-half of each buffer location to a respective one of the micro-threads. FIG. 6A shows two buffer locations with data corresponding to two ranks of memory. The figure is merely illustrative; any buffer location for a given thread can have data for any of the ranks for that thread. As before, the rank, thread arbiter logic 626 generates the appropriate control signals which are coupled via the controller PHY to the memory 670. In this mode, signals CS0y and CS0z are both directed to Rank 0, with each of them coupled to a corresponding micro-thread of each DRAM device of Rank 0. Similarly, signals CS1y and CS1z are coupled to memory Rank 1, micro-threads y and z, respectively.

1 Rank 4 Thread Mode

FIG. 7A is a simplified block diagram of a memory controller configured in a 1 Rank, 4 Thread mode of operation. In FIG. 7A, command processing logic on the right side of the figure is similar to that of FIG. 1A described above. In FIG. 7A, however, data buffers (732 & 754) and multiplexer 756 are double the width as compared to FIGS. 1 through 6. Here, the data path architecture is extended to support 4 threads. In general, the data path architecture may be extended to support other memory configurations.

In this example, as the reader can see in FIG. 7A, each one of four CA blocks is allocated to a respective thread of a single-rank memory 770 (FIG. 7B). In the memory, each thread has a corresponding X16 DQ bus (Thread 0-Thread 3). All four auto refresh and calibration circuits are used; each of them is assigned to a corresponding memory thread as shown in FIG. 7A. As discussed above, the controller resources are allocated in response to configuration bits of a mode register 728. Such bits may include, for example, rank and thread counts of the memory in use. The read data buffer 754 and write data buffer 732 are arranged for buffering the four threads of read and write data, respectively, as indicated by the hatching in the drawing.

The following table points out some of the features of some of the modes described above. It is merely illustrative and does not show all possible controller configurations or modes of operation.

TABLE 2

Comparison among Selected Operating Modes

| Mode | Command Path | Data Path |
|---|---|---|
| 2 Rank, 2 Thread | 4 CA blocks assigned to R0T0, R0T1, R1T0, R1T1 CA Queue depth per block = $d_1$ | DQ width per thread = $w_1$ Buffer depth per thread = $d_2$ |
| 4 Rank, 1 Thread | 4 CA blocks assigned to R0, R1, R2, R3 CA Queue depth per block = $d_1$ | DQ width = $2*w_1$ Buffer depth = $2*d_2$ |
| 2 Rank, 1 Thread | 2 CA blocks assigned to R0, R1 CA Queue depth per block = $2*d_1$ | DQ width = $2*w_1$ Buffer depth = $2*d_2$ |

The various hardware resources, configurations and modes shown in the drawing figures are merely illustrative and not intended to be limiting. It will be apparent to those having skill in the art that many changes may be made to the details of the above-described embodiments without departing from the underlying principles of the disclosure. The scope of the present disclosure should, therefore, be determined only by the following claims.

The invention claimed is:

1. A memory controller comprising:
    a request interface for servicing a memory access request;
    a memory interface for interconnecting the memory controller with at least one memory rank;
    command logic coupled to the request interface and coupled to the memory interface, the command logic including hardware resources arranged for generating control signals to access at least one memory rank via the memory interface responsive to memory access requests, the command logic comprising first and second request queues and first and second schedulers, wherein,
    in at least one operating mode, the first scheduler schedules memory access requests from the first request queue and the second scheduler schedules memory access requests from the second request queue, and
    in at least one other operating mode, the first scheduler schedules memory access requests from both the first request queue and the second request queue; and
    arbiter logic, operatively coupled to the command logic, the arbiter logic configured to steer the control signals to at least one memory rank based on a current operating mode of the memory controller.

2. The memory controller according to claim 1 and further comprising a register block, wherein the register block includes at least one mode register for storing a configuration of memory to be accessed via the memory interface, the memory configuration including a rank count and a thread count.

3. The memory controller according to claim 1 wherein the first and second request queues are reconfigurable, based on the current operating mode of the memory controller, so as to logically extend the first request queue to include the second request queue.

4. The memory controller according to claim 1 wherein the command logic hardware resources include J request queues that include the first and second request queues, where J is an integer greater than or equal to two, and the J request queues are reconfigurable so as to form I logically extended queues, where I is less than or equal to J, including a single extended request queue, based on the current operating mode of the memory controller.

5. The memory controller according to claim 1 wherein: the command logic hardware resources are arranged to form a plurality of command (CA) blocks, each command block including a request queue; and
at least one command block is reconfigurable so as to allocate the request queue of the one command block so as to extend the request queue of another one of the command blocks.

6. The memory controller according to claim 5 wherein: the number of command blocks equals N*M, both integers ≥1 and N*M>1;
each one of the command blocks is allocable to a respective memory rank where the memory thread count is one; and
the command blocks are reconfigurable so as to access N ranks and M threads in cases where the memory thread count is greater than one.

7. The memory controller according to claim 5 wherein: the number of command blocks equals K, an integer ≥2;
each one of the K command blocks is allocable to a respective rank where the memory thread count is one; and
the command blocks are reconfigurable so as to re-allocate each command block to a respective thread where the memory rank count is one and the thread count is K.

8. The memory controller according to claim 5 wherein: the number of command blocks equals N*M, both integers ≥1 and N*M>1; and
each of the command blocks is configurable for accessing a respective one of the memory spaces in the memory, each memory space defined by a corresponding rank and thread, when the current configuration of the memory is rank count R and thread count T, where R and T are integers ≥1, and N*M is ≥R*T.

9. The memory controller according to claim 5 wherein: each command block further includes a bank FSM component; and
at least one bank FSM component is reconfigurable to a low power state in the case that the request queue of one command block is allocated so as to extend the request queue of another one of the command blocks.

10. A memory controller comprising:
a request interface for servicing a memory access request;
a memory interface (PHY) for interconnecting the memory controller with a memory;
command logic coupled to the request interface and coupled to the memory interface, the command logic including a plurality of command blocks (CA), each command block including an associated request queue; and
at least one mode register for storing a configuration of a memory to be accessed via the memory interface, the memory configuration including a rank count and a thread count;
wherein the command blocks are reconfigurable responsive to the memory configuration, so as to allocate the request queue of a first one of the command blocks to extend the depth of the request queue of a second one of the command blocks.

11. The memory controller according to claim 10, wherein each command block includes a bank FSM and at least one of the command blocks is reconfigurable responsive to the memory configuration, to disable the bank FSM of the command block to reduce power consumption.

12. The memory controller according to claim 11 wherein: each command block includes a corresponding auto-refresh circuit; and
at least one auto-refresh circuit is arranged to be disabled to reduce power consumption when the corresponding command block bank FSM is disabled.

13. The memory controller according to claim 11 and further comprising a corresponding calibration circuit coupled to each of the command blocks; and
wherein each calibration circuit is arranged to be disabled to reduce power consumption when the corresponding command block FSM is disabled.

14. The memory controller according to claim 10 and wherein the mode register reflects a micro-threaded configuration of the memory, and the command logic allocates each command block for accessing a respective memory space of the memory, each memory space defined by a corresponding rank and micro-thread.

15. The memory controller according to claim 10 and further comprising:
a read data buffer coupled to the request interface for buffering read data; and
a read data router arranged for writing read data from the data bus into the read data buffer;
wherein the read data buffer is reconfigurable responsive to the memory configuration.

16. The memory controller according to claim 15 wherein the read data buffer is reconfigurable so as to extend a depth of the read data buffer when the number of command blocks is greater than a product of the memory rank count times the memory thread count as reflected in the mode register.

17. The memory controller according to claim 15 wherein a write data buffer is reconfigurable so as to extend a depth of the write data buffer when the number of command blocks is greater than a product of the memory rank count times the memory thread count as reflected in the mode register.

18. The memory controller according to claim 10 and further comprising:
a read data buffer coupled to the request interface for buffering read data; and
a read data router arranged for writing read data from the data bus into the read data buffer;
wherein the read data router is reconfigurable responsive to the mode register content for steering read data from a plurality of microthreads of a micro-threaded memory into the read data buffer.

19. The memory controller according to claim 10 and further comprising:
a read data buffer coupled to the request interface for buffering read data; and
a read data router arranged for writing read data from the data bus into the read data buffer;
wherein the read data buffer is reconfigurable responsive to the mode register content for storing read data from a plurality of microthreads of a micro-threaded memory, the read data buffer allocating a respective portion of the read data buffer for storing read data from each of the microthreads.

20. A method for accessing a memory, the method comprising:
reading information stored in a mode register of a memory controller descriptive of a memory configuration, the information indicating a rank count and a thread count of the memory configuration;

configuring command logic for accessing the memory, the command logic including a plurality of command blocks;

defining a memory space as a selected rank and thread pair; and responsive to the information stored in the mode register, and in a case where the number of command blocks exceeds the number of memory spaces, allocating at least a portion of at least two of the command blocks for accessing a selected memory space of the memory.

21. The method of claim 20 wherein each command block includes a request queue, and further comprising extending a depth of a first one of the request queues by allocating a second one of the request queues to extend the first request queue.

22. The method of claim 21 wherein each command block includes an associated request queue, and a bank finite state machine (FSM); and further comprising disabling the finite state machine of the command block of the second request queue.

23. The method of claim 21 wherein each command block includes an associated request queue and a scheduler; and further comprising disabling the scheduler of the command block of the second request queue.

24. The method of claim 21 and further comprising:
providing an auto-refresh circuit associated with each of the command blocks; and
disabling the corresponding auto-refresh circuit associated with the command block of the second request queue.

25. The method of claim 21 and further comprising:
providing a calibration circuit associated with each of the command blocks; and
disabling the corresponding calibration circuit associated with the command block of the second request queue.

26. The method of claim 20 and further comprising:
providing a read data buffer for buffering read data; and
reconfiguring the memory controller to access the read data buffer responsive to the information stored in the mode register.

27. The method of claim 26 wherein reconfiguring the memory controller includes extending a depth of the read data buffer when the number of command blocks is greater than a product of the rank count times the thread count as reflected in the mode register.

28. The method of claim 26 including reconfiguring the memory controller to allocate buffer space for a number of micro-threads M of read data, responsive to the mode register indicating a micro-threaded memory having a number of micro-threads M.

29. A method for accessing a memory, the method comprising:
reading information stored in a mode register of a memory controller, the stored information including a rank count and a thread count of a memory;
providing a data router for routing data between the memory and a data buffer; and
reconfiguring the memory controller to route data utilizing the data router responsive to the information stored in the mode register.

30. The method of claim 29 and further comprising:
providing a data buffer for buffering data between the memory and a client interface; and
reconfiguring the memory controller to access the data buffer responsive to the information stored in the mode register.

31. The method of claim 30 wherein:
the information stored in the mode register includes a thread count equal to one;
reconfiguring the memory controller includes extending a depth of the data buffer; and
reconfiguring the memory controller includes arranging the data router for directing read data from a single thread data bus into the extended data buffer.

* * * * *